United States Patent
Levine et al.

(10) Patent No.: US 6,189,789 B1
(45) Date of Patent: Feb. 20, 2001

(54) METHOD AND SYSTEM FOR A MERCHANDISE CHECKOUT SYSTEM

(75) Inventors: Frank Eliot Levine, Austin; Danny Marvin Neal, Round Rock, both of TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/149,709

(22) Filed: Sep. 9, 1998

(51) Int. Cl.$^7$ .................................................. G06K 15/00
(52) U.S. Cl. ................ 235/383; 235/462.46; 235/472.02
(58) Field of Search ...................................... 235/383, 378, 235/381, 462.45, 462.46, 472.01, 472.02

(56) References Cited

U.S. PATENT DOCUMENTS

| | | | |
|---|---|---|---|
| 4,779,706 | 10/1988 | Mergenthaler | 186/61 |
| 5,083,638 | 1/1992 | Schneider | 186/61 |
| 5,115,888 | 5/1992 | Schneider | 186/61 |
| 5,123,494 | 6/1992 | Schneider | 177/50 |
| 5,168,961 | 12/1992 | Schneider | 186/52 |
| 5,239,167 | 8/1993 | Kipp | 235/383 |
| 5,250,789 | 10/1993 | Johnsen | 235/383 |
| 5,393,965 | 2/1995 | Bravman et al. | 235/383 |
| 5,424,524 | 6/1995 | Ruppert et al. | 235/462 |
| 5,494,136 | 2/1996 | Humble | 186/61 |
| 5,497,853 | 3/1996 | Collins, Jr. et al. | 186/61 |
| 5,540,301 * | 7/1996 | Dumont | 235/383 |
| 5,635,906 | 6/1997 | Joseph | 340/572 |
| 5,649,114 | 7/1997 | Deaton et al. | 395/214 |
| 5,804,807 * | 9/1998 | Murrah et al. | 235/383 |
| 5,825,002 * | 10/1998 | Roslak | 235/375 |
| 5,855,007 | 12/1998 | Jovicic et al. | 705/14 |
| 5,884,281 | 3/1999 | Smith et al. | 705/26 |
| 5,978,772 * | 11/1999 | Mold | 235/383 |
| 5,979,758 * | 11/1999 | Swartz et al. | 235/383 |

OTHER PUBLICATIONS

"Grocery Buggy", Technical Disclosure Bulletin, vol. 31, No. 6, Nov. 1988, pp. 399–400.

* cited by examiner

Primary Examiner—Thien M. Le
Assistant Examiner—Daniel St. Cyr
(74) Attorney, Agent, or Firm—Volel Emile; Felsman, Bradley, Vaden, Gunter & Dillon, LLP

(57) ABSTRACT

A method and system for a merchandise checkout system utilizes a remote scanning device, a shopping cart and bags for allowing a purchaser to buy merchandise unassisted by store personnel. The remote scanning device reads product identity information from coded levels on products chosen by the purchaser and sends the information to a central processor. The central processor has a memory, which indexes price information and weight for each product based on the product identity information. The central processor sends an accumulated price and weight transaction to the remote scanning device for the purchaser's use. The product identity information on the products further include a security tag device which is deactivated by the remote scanning device. The purchaser upon completion of their purchases takes their shopping cart to a security station for weighing in on a scale wherein an actual combined weight of the shopping cart, bags and products is compared to a predicted weight determined by the central processor and generating a notification signal if a discrepancy occurs. The security station further verifies that the security tag devices have been deactivated and also generates a notification signal. The purchaser next goes to a payment checkout terminal coupled to the central processor, wherein the payment checkout terminal effects financial transactions including acceptance of payment for transactions initiated by the remote scanning device, and the payment checkout terminal is operable by store personnel only.

23 Claims, 4 Drawing Sheets

METHOD AND SYSTEM FOR A MERCHANDISE CHECKOUT SYSTEM

BACKGROUND OF THE INTENTION

1. Technical Field

The present invention is directed to an improved method and system for merchandise checkouts having a high level of security in processing purchased merchandise items that enables a self-service operation to occur and in particular to a system for speeding up customer checkouts in high volume retail establishments. Still more particularly the present invention relates to an improved method which allows a purchaser to bag and scan their own merchandise.

2. Description of the Related Art

Large retail stores frequently have many checkout lanes in order to be able to handle higher customer throughput at peak periods. Such lanes tend to be crowded together as much as possible in an attempt to minimize the square footage required for the checkout function. Additionally, many of these lanes remain idle during a considerable portion of any given business day and waste the square footage allocated to them.

A modern retail or grocery store checkout lane typically includes a cash register that is used to check out merchandise items bearing bar code labels. A cashier removes items from a movable conveyor belt one at a time, drags them across the laser beam of a fixed scanner (e.g., a "slot" scanner built into a horizontal counter), and places them on a shopping carrier, such as a cart. The fixed scanner is linked with a processor, e.g., a CPU built into the cash register, that translates the bar code symbol on a package into a cash register entry including the price of the scanned item. Downstream of the cash register on the conveyor belt is a sacking station; one or more baggers removes previously scanned items from the conveyor belt and places items in paper or plastic sacks. When all items have been scanned or otherwise checked, the cash register tallies the prices of the items, factors in any discounts (e.g., coupon discounts) or other adjustments (e.g., sales taxes on some items), displays the total to be paid by the customer, and prints a receipt. While the purchases are being "rung up," the customer may write a check to pay for the purchases or deliver a credit card to the cashier.

A problem that arises with the above-described system is the fact that typically only one person at a time empties a shopping cart and scans the items contained therein thereby limiting the efficiency of the process. It is conceivable that two or more persons could theoretically share a fixed scanner, but this could easily create physical coordination problems involving each person getting in the other person's way. Because of the current system of checking out merchandise, long customer lines occur resulting in wasted time for the consumer and valuable retail space that could be used for more merchandise is lost in supporting multiple checkout lanes and loss of store revenue in supporting the store staff to handle the operations.

Additionally, shoplifting is a major problem for retail stores, resulting in the loss of millions of dollars each year. The most common type of shoplifting is that in which the shoplifter removes the shoplifted item from a store by wearing the item or by hiding the item on their person or in their bags. One well-known system developed to reduce this type of shoplifting involves attaching a security tag to the items in the store. The security tag contains a circuit or other means that interacts with a detection system located near the exit of the store. The detection system sounds an alarm if an item passes therethrough with a security tag that has not been deactivated. This type of security tag is typically deactivated or removed by a cashier when the item is purchased. The tag is usually deactivated by being passed over an electromagnetic apparatus.

However, a problem arises with this type of security system in that if a store cashier is acting in concert with the shoplifter, the cashier may deactivate or remove the security tags without accepting payment for the items. Typically, the shoplifter will bring a number of purchases to the cashier, who will ring up less than all of the purchases, often discounting the prices on the purchased items. The cashier will then place the remaining unpurchased items in the shoplifter's bags. Prior to placing the items in the bags, the cashier will deactivate the security tags on the stolen items so that the security detection apparatus near the exit of the store will not detect them. Therefore, if a cashier is acting in concert with a shoplifter, it is possible to steal a very large number of items with relative ease.

In view of the above, it should be apparent that a method which allows merchandise checkouts to have a high level of security in processing purchased merchandise items and for speeding up customer checkouts in high volume retail establishments would be highly desirable.

SUMMARY OF THE INVENTION

It is therefore one object of the present invention to provide an improved method and system for purchasing merchandise items that enables a self-service operation to occur.

It is another object of the present invention to provide a method which improves the throughput speed for checking out and paying for multiple items in a high volume store.

It is yet another object of the present invention to provide a checkout system having a high level of security in processing purchased merchandise items that enables a self-service operation to occur.

The foregoing objects are achieved as is now described. A method and system for a merchandise checkout system utilizes a remote scanning device, a shopping cart and bags for allowing a purchaser to buy merchandise unassisted by store personnel. The method and system consists of having a remote scanning device that reads product identity information from coded levels on products chosen by the purchaser and sends the information to a central processor. The central processor has a memory, which indexes price information and weight for each product based on the product identity information. The central processor sends an accumulated price and weight transaction to the remote scanning device for the purchaser's use. The product identity information on the products further includes a security tag device which is deactivated by the remote scanning device. The purchaser upon completion of their purchases takes their shopping cart to a security station for weighing in on a scale wherein an actual combined weight of the shopping cart, bags and products is compared to a predicted weight determined by the central processor and generating a notification signal if a discrepancy occurs. The security station further verifies that the security tag devices have been deactivated and also generates a notification signal. The purchaser next goes to a payment checkout terminal coupled to the central processor, wherein the payment checkout terminal effects financial transactions including acceptance of payment for transactions initiated by the remote scanning device, and the payment checkout terminal is operable by store personnel only.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
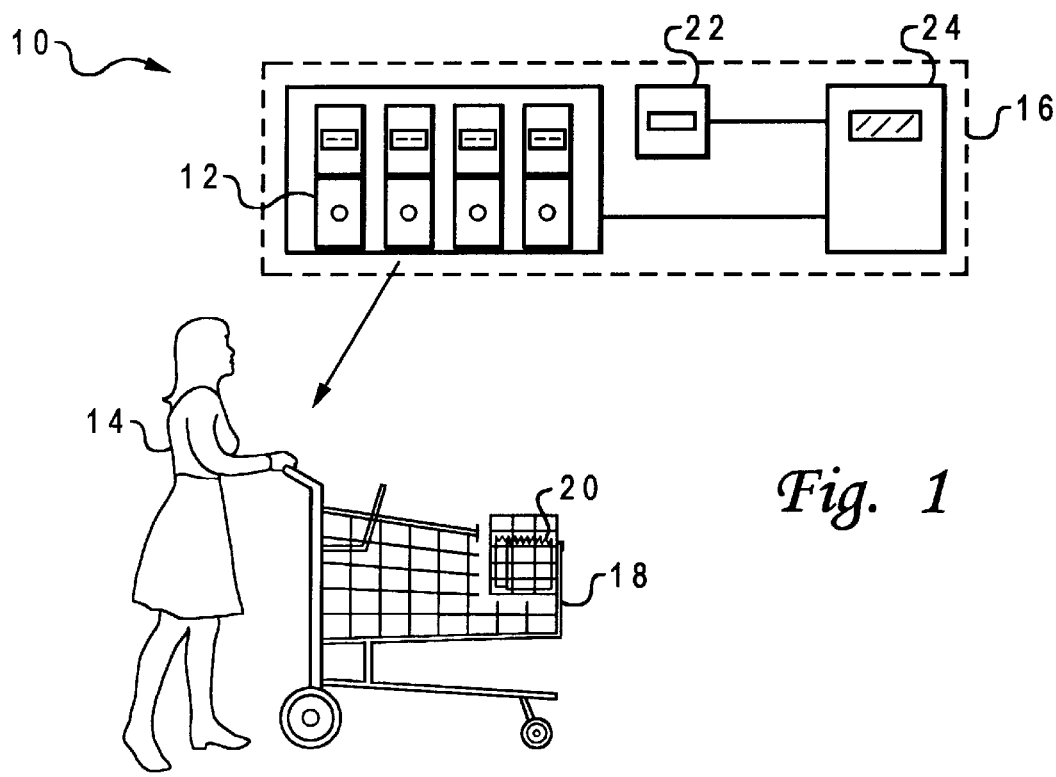
FIG. 1 is a block diagram of a starting point for a merchandise checkout system in accordance with the present invention.

With reference now to the figures and in particular with reference to FIG. 1, there is depicted a block diagram of an illustrative embodiment of one starting point for a merchandise checkout system 10 in accordance with the present invention. The merchandise checkout system 10 consists of delivering a remote scanning device 12 to a purchaser 14 at a check-in station 16 positioned near an entrance of the checkout system 10 and having the purchaser 14 pick up a shopping cart 18 and bags 20 for the placement of products chosen by the purchaser 14. As will be more fully described below, the remote scanning device 12 is operable to read product identity information from coded levels on products chosen by the purchaser 14. Referring once again to FIG. 1, the check-in station 16 consists of a reader 22 for accepting discount coupons, not shown, from the purchaser 14 and transferring this information from the coupons to a central processor or computer system 24 for adjusting the indexing price information for use with the remote scanning device 12 utilized by the purchaser 14, as will be more fully described below.

Figure 2:
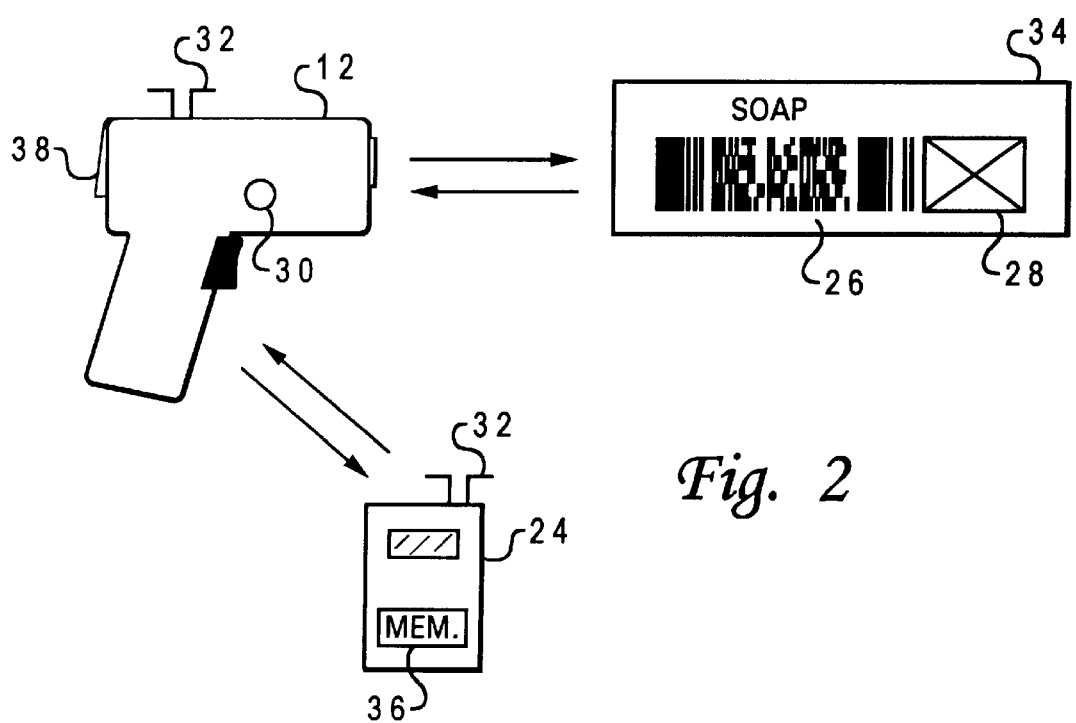
FIG. 2 is a block diagram of using a remote scanning device with the checkout system shown in FIG. 1.

Referring now to FIG. 2, there is shown a block diagram of a preferred embodiment of using the remote scanning device 12 with the checkout system 16 shown in FIG. 1. As shown in FIG. 2, the remote scanning device 12 reads product identity information 26 from coded levels on products 34 chosen by the purchaser 14 and sends the information to the central processor or computer system 24 by any wireless telecommunication techniques known in the data communication arts. By way of example but not of limitation, the coded levels may be industry standard bar codes read by infra-red technology. The central processor or computer system has a memory 36, which indexes price information and weight for each product 34 based on the product identity information 26. The central processor 24 sends an accumulated price and weight transaction to the remote scanning device 12 where it is shown on a display 38 for the purchaser's 14 use, as will be more fully detailed below. The product identity information 26 on the products 34 further includes a security tag device 28 which is deactivated by the remote scanning device 12, as will be more fully described below.

Referring once again to FIG. 2, the remote scanning device 12 and central processor or computer system 24 each include a radio frequency (RF) transceiver 32 so that the remote scanning device 12 and central processor 24 are coupled to each other for data communication. In accordance with the method of the present invention, the purchaser 14, utilizes the remote scanning device 12 to read the product identity information 26 which then transmits the information 26 to be received by the central processor 24. The central processor or computer system 24 using its indexing price information in memory 34 in association with the received product identity information 26 calculates a new total price wherein the new total price is transmitted to and received by the remote scanning device 12 and displayed 38 to the purchaser 14.

Additionally, the central processor or computer system 24 has included in memory 36 the weight of each product 34 in association with the product identity information 26 wherein the central processor or computer system 24 and the remote scanning device 12 are operable in conjunction with each other to accumulate a weight transaction from a series of products 34 presented for purchase. Also, the remote scanning device 12 further includes an indication such as a short beep through a speaker 30 for notifying the purchaser 14 that a successful read of the product identity information 26 and deactivation of the security tag device 28 has been accomplished.

Figure 3:
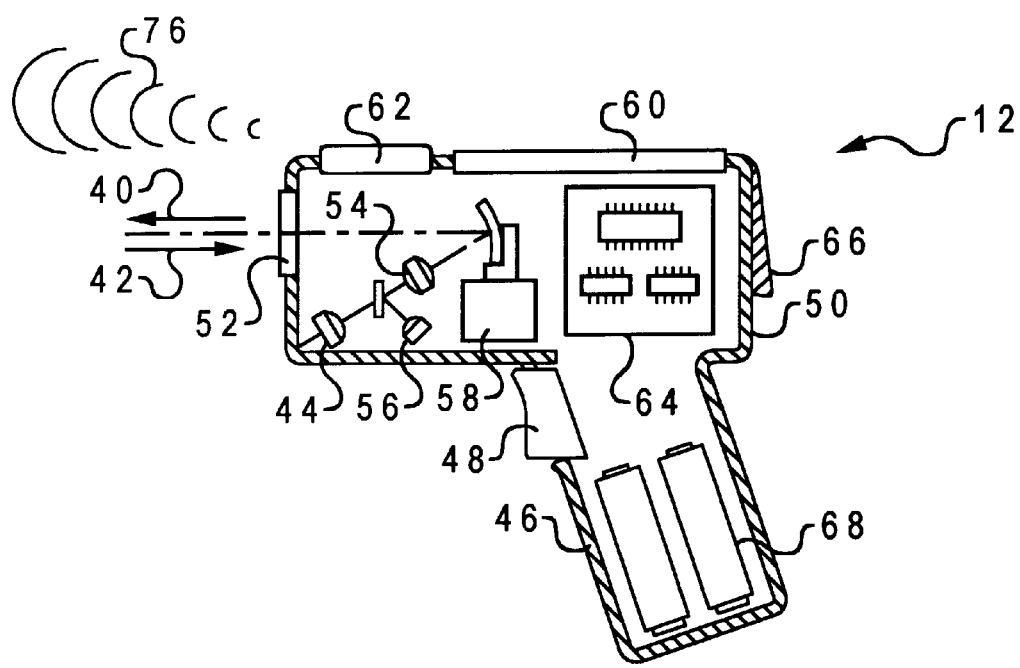
FIG. 3 is a sectional view of a remote scanning device which may be used with the checkout system shown in FIG. 2.

Turning now to FIG. 3, there is illustrated one remote scanning device 12 for use in accordance with the present invention. Although other remote scanning devices 12 may be advantageously employed in the checkout system 16 having features of the invention, a hand-held, laser-scan, bar code reader unit illustrated in FIG. 3 is an example of a remote unit particularly suited for use in the checkout system 16 of FIG. 1. Referring now to FIG. 3, an outgoing light beam 40 is generated in the remote scanning device 12, usually as a laser diode or the like, and directed to impinge on a bar code symbol 26 a few inches from the front of the remote scanning device 12. The outgoing beam 40 is scanned in a fixed linear pattern, and the purchaser 14 positions the remote scanning unit 12 so this scan pattern traverses the bar code symbol 26 to be read. Reflected light 42 from the symbol is detected by a light-responsive device 44 in the remote scanning unit 12, producing serial electrical signals to be processed for identifying the bar code symbol 26, shown in FIG. 2.

Referring once again to FIG. 3, the remote scanning device 12 may be designed as a gun-shaped device having a pistol grip type of handle 46, wherein a movable trigger 48 is employed to allow the purchaser 14 to activate the light beam 40 and encased detector circuitry when pointed at the bar code symbol 26 to be read, thereby saving battery life if the unit is self powered. A lightweight plastic housing 50 contains the laser light source, the detector 46, and the optics and signal processing circuitry for use with the RF transceiver 32 of FIG. 2, as well as a battery. A light transmissive window 52 in the front end of the housing 50 allows the outgoing light beam 40 to exit and the incoming reflected light 42 to enter.

Also seen in FIG. 3 in connection with the remote scanning device 12 are a lens 54 used to collimate and focus the scanned beam into the bar code symbol 26 at the proper depth of field. Additionally, a light source 56 such as a semiconductor diode; and an oscillating mirror attached to a scanning motor 58 are activated when the trigger 48 is pulled. The electronic components for translating, storing and sending the total price to a display screen 66 are mounted on one or more small circuit boards 64 within the housing 50, and the batteries 68 are enclosed to provide a self-contained portable unit. The antenna may be printed on one of the circuit boards 64.

Figure 4:
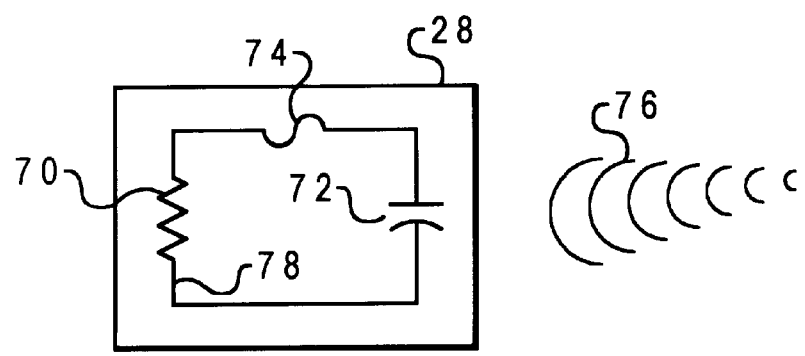
FIG. 4 is a circuit diagram for use in a security tag device which may be used with the checkout system shown in FIG. 2.

Referring now to FIGS. 3 and 4, there is shown one embodiment for a security tag device 28 and a method to deactivate it in accordance with the present invention. As shown in FIG. 4, the security tag device consists of a resonating circuit 78 having a resistor 70, capacitor 72 and fuse 74 connected together in electrical series. In operation the circuit 78 is designed to resonant at a particular electromagnetic frequency, for example in the 1 to 1.2 Ghz range. If a strong enough electromagnetic wave 76 impinges on the circuit, the circuit will excite and generate enough current to blow the fuse 74 thereby disabling the electrical circuit 78 and deactivating the security tag device 28. It should be appreciated by those skilled in the art that the electrical circuit 78 might be fabricated using discrete components, mylar techniques or other thin film applications known in the electrical arts. Turning once again to FIG. 3, the remote scanning device 12 includes RF circuitry 60 to produce a frequency and to generate sufficient power to launch a pulse of an electromagnetic wave 76 through antenna 62 to disable the electrical circuit and deactivating the security tag device 28 as described above. The RF circuitry 60 is coupled to the trigger 48 so that the security device will be disabled at the same instance the bar code symbol 26 is read.

Although not shown, it should be appreciated that at least one or more return stations are positioned throughout the store for store personnel to receive unwanted products that have already been scanned by a purchaser 14. In this case the store personnel receives the product 34 from a purchaser 14 who has changed their mind about the purchase, updates the remote scanning device 12 with the central processor 24 to reflect an adjusted price total and weight and returns the remote scanning device 12 to the purchaser 14 for continued use. Since the electrical circuit 78 has been disabled, the store personnel then or at a later time replaces the product identity information 26 having security tag device 28 with a new product identity information 26 and security tag device 28 on the returned products and returns the products 34 to the shelf.

Figure 5A:
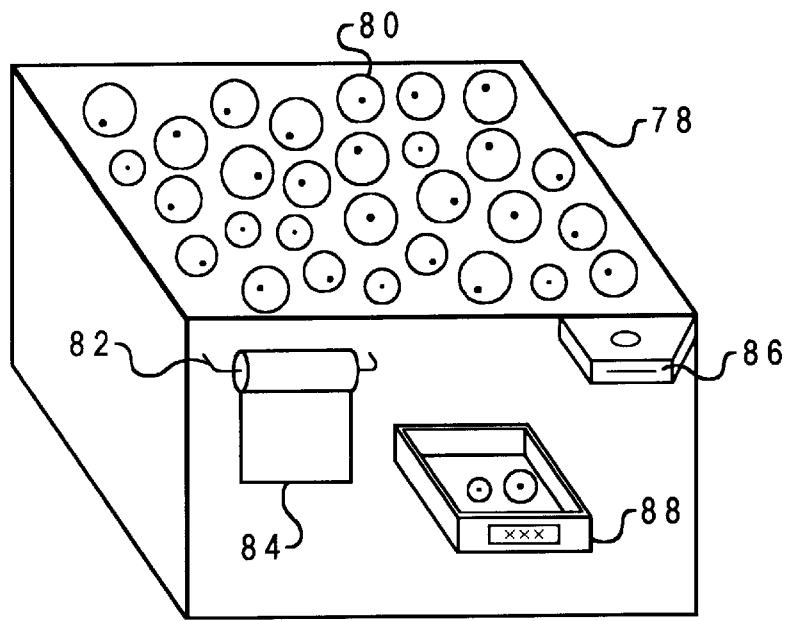
FIG. 5A is a perspective view of a produce stand, bag holder, weight scale and bar code printer and dispenser in accordance with the checkout system of the present invention.
Figure 5B:
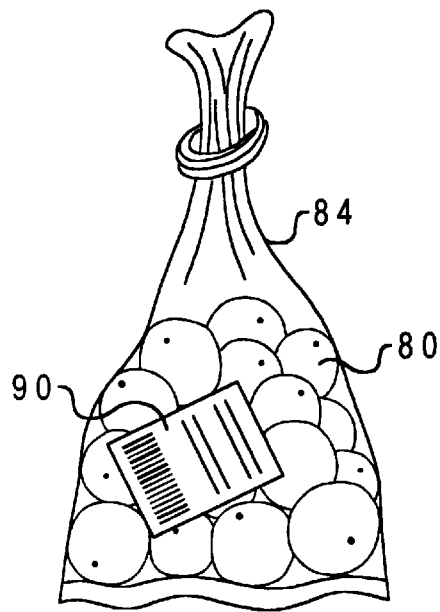
FIG. 5B is a perspective view of a bag of produce with a bar coded label applied thereon.

Referring now to FIGS. 5A and 5B, there is shown a perspective view for handling non-bar coded items such as produce. Referring to FIG. 5A, there is illustrated a typical produce stand 78 or produce dispenser containing fruit or vegetables 80 or the like and attached to the produce stand 78 are a bag holder 82 containing thin clear plastic bags 84 and a bar code printer and dispenser 86. Adjacent to the produce stand 78 is a weight scale 88 for measuring the produce 80 the purchaser 14 wishes to buy. In accordance with the method of the present invention, the purchaser 14 places the amount of produce 80 they desire in a clear plastic bag 84 and places the bag 84 and produce 80 on the weight scale 88. Next, after the weight has been determined the bar coded dispenser 86 is activated which contains self-adhesive bar coded labels indicative of a product code corresponding to the adjacently located produce 80. A self-adhesive bar coded label 90 is then printed and dispensed after produce is placed and weighed in the produce bags. Referring now to FIG. 5B, the self-adhesive bar coded labels 90 are attached to the produce bags 84 containing the produce 80 and then read by the remote scanning device 12. For enhanced security, at least one or more monitoring stations are positioned adjacent to the produce stands 78 for store personnel to verify that the produce bags 84 are properly weighed, labeled and read by the remote scanning device 12 by the purchaser 14.

Figure 6:
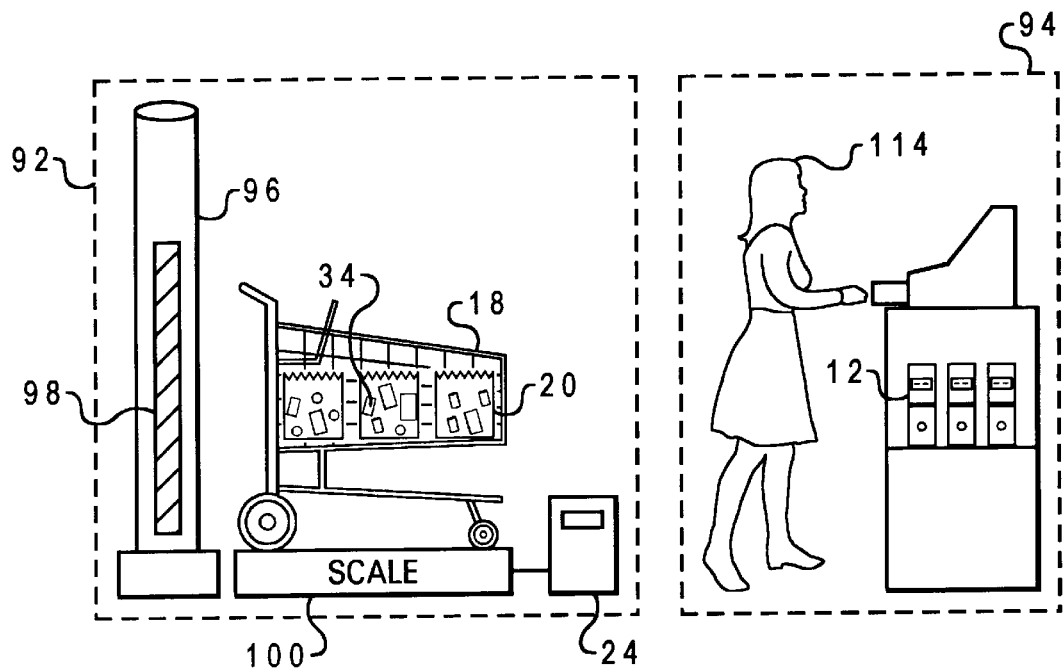
FIG. 6 is a block diagram of a security station and checkout terminal positioned near an exit of the checkout system in accordance with the present invention.

Referring now to FIG. 6, there is illustrated a block diagram of a security station 92 and checkout terminal 94 positioned near an exit of the checkout system which may be used in accordance with the invention. The security station 92 is located in front of the checkout terminal 94 for verification that the security methods of the present invention have been properly executed before payment is accepted. The security station 92 includes a security tag detection device apparatus 96 for generating a notification signal if at least one item in the shopping cart 18 and the bags 20 have not been deactivated by the remote scanning device 12. The security detection apparatus 96 has electrical circuitry 98 that sends and receives the proper electromagnetic frequency has described before but at a much lower power level. If the fuse within the security device tag has not been blown, the security device tag will launch a resonant spike, which will be detected by the security tag detection device 96, and an alarm will go off.

Figure 7:
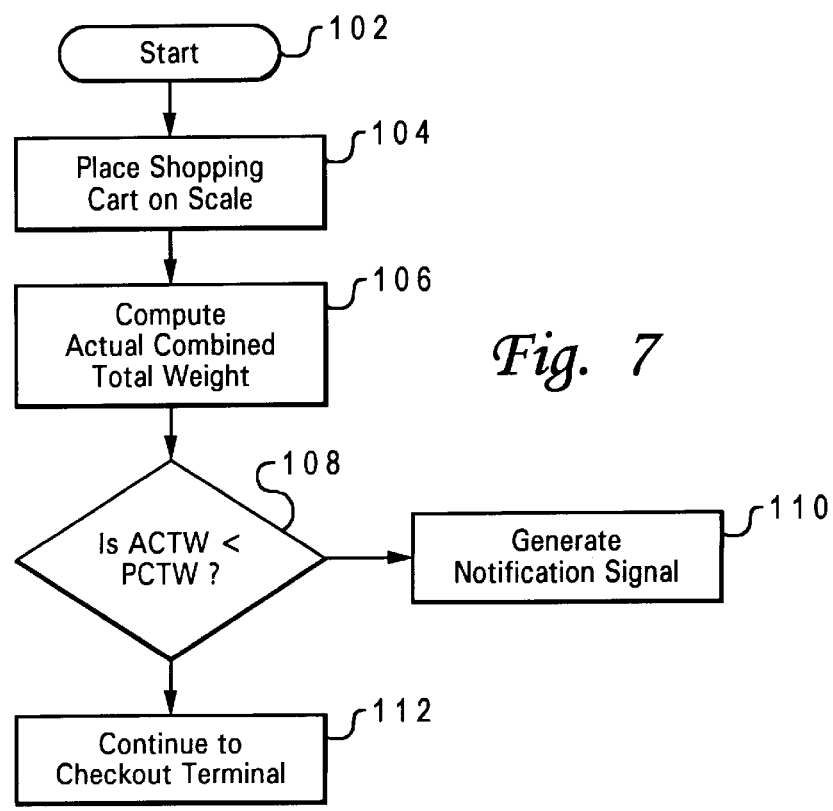
FIG. 7 is a flow diagram of an algorithm used to determine if a weight discrepancy exits with the security station shown in FIG. 6.

Referring once again to FIG. 6, the security station 92 further includes a weight scale 100 for determining the actual combined total weight of the shopping cart 18 and bags 20 containing the products 34 purchased during a purchase transaction using the remote scanning device 12. Turning now to FIG. 7, there is shown a flow diagram of the algorithm used to determine if a weight discrepancy exits. To start 102, the shopping cart 18 containing the products 34 within the bags 20 is moved 104 onto the weight scale 100, as shown in FIG. 6. The actual combined total weight of the shopping cart 18, bags 20 and products 34 are weighed 106 and then sent to the central processor 24. The central processor 24 has in memory the actual weight of the shopping cart 18 and bags 20 before they were delivered to the purchaser 14 at check-in. The central processor 24 then compares the actual combined total weight with a predicted total weight determined by the central processor 24 from information received by the remote scanning device 12 as shown in step 108. If the actual combined total weight is not within a predetermined range of the predicted total weight a notification signal is generated, shown in step 110, such as sound to alert store personnel to the discrepancy and possible security violation. If no weight discrepancy exists, the purchaser 14 proceeds to the checkout terminal 94 shown in step 112.

Turning once again to FIG. 6, if both security measures are passed, the shopping cart 18 is moved forward to the checkout terminal 94 for checking out the products 34 contained within the shopping cart 18 and bags 20. The payment checkout terminal 94 is operable by store personnel 114 only and coupled in data communication with the central processor 24 and is operable to effect financial transactions including acceptance of payment for transactions initiated by the remote scanning device 12. The remote scanning device 12 is then is delivered back to store personnel 114 and the merchandise checkout method is complete. It should be appreciated that the information received from the remote scanning unit to the central processor is used to update inventory and stock control.

To summarize, the present invention provides a system for operator-unassisted checkout of randomly disposed articles in a shopping cart at a checkout area, a system without directly contacting the articles in the shopping cart and discriminating between the articles of the shopping cart to determine which have not been properly checked out. The system of the present invention is inexpensive and easy to manufacture, maintain and operate.

While the invention has been particularly shown and described with reference to a preferred embodiment, it will be understood by those skilled in the art that various changes in form and detail may be made therein without departing from the spirit and scope of the invention.

What is claimed is:

1. A method for a merchandise(r) checkout system comprising:

providing a purchaser with a remote scanning device for scanning a product tag included on each of a plurality of products, said product tag including a security tag device and product identity information associated with one of said plurality of products to which said product tag is affixed;

scanning said product tag for each of said plurality of products utilizing said remote scanning device;

reading said product identity information included within said product tag for said one of said plurality of products and deactivating said security tag device generally simultaneously with said reading during said scanning utilizing said remote scanning device, said security tag device capable of being deactivated only in response to said product identity information being read;

wirelessly transmitting said product identity information to a computer system, said computer system having a price information corresponding to said product identity information, said computer system calculating said price information from each of said product identity information to accumulate a total; and providing said total to one of a plurality of terminals when said purchaser is finished.

2. The method for a merchandise checkout system according to claim 1, further comprising the step of providing said remote scanning device to said purchaser at a check-in station positioned near an entrance of said checkout system for accepting discount coupons from said purchaser and transferring information on said coupons to said computer system for adjusting said price information for use with said remote scanning device.

3. The method for a merchandise checkout system according to claim 2, further comprising the steps of:

wirelessly transmitting from said remote scanning device to said computer system, said computer system having a radio frequency (RF) transceiver and said remote scanning device also having said radio frequency (RF) transceiver wherein when said purchaser reads said product identity information, said product identity information is transmitted to and received by said computer system, and calculating said price information in association with said received product identity information by said computer system producing a new total price wherein said new total price is transmitted to and received by said remote scanning device and displayed to said purchaser.

4. The method for a merchandise checkout system according to claim 3, further comprising the step of deactivating said security tag device utilizing said remote scanning device when reading said product identity information on products chosen by said purchaser.

5. The method for a merchandise checkout system according to claim 4, further comprising the step of positioning at least one payment checkout terminal near an exit of said checkout system, and coupling said payment checkout terminal in data communication with said computer system, said payment checkout terminal being operable to effect financial transactions including acceptance of payment for transactions initiated by said remote scanning device.

6. The method for a merchandise checkout system according to claim 5, further comprising the step of positioning at least one return station in said checkout system for receiving already read products by said purchaser and updating said remote scanning device with said computer system to reflect an adjusted price total.

7. The method for a merchandise checkout system according to claim 3, further comprising the steps of:

positioning a security station near an exit of said checkout system, determining an actual combined total weight of said shopping cart containing said products purchased during a purchase transaction by said remote scanning device, wherein said computer system including an actual weight of said shopping cart in memory; and comparing said actual combined total weight of said shopping cart with a predicted total weight determined by said computer system and generating a notification signal when said actual total weight is not within a predetermined range of said predicted total weight for said transaction.

8. The method for a merchandise checkout system according to claim 5, further comprising the step of positioning a security station near an exit of said checkout system, and generating a notification signal by a security tag detection device if at least one item in said shopping cart has not been deactivated by said remote scanning device.

9. The method for a merchandise checkout system according to claim 3, further comprising the step of positioning first dispensers holding produce bags and weight scales and second dispensers for generating self-adhesive bar coded labels positioned next to produce stands, said bar coded labels indicative of a product code corresponding to a produce wherein said self-adhesive bar coded labels are printed and dispensed after said produce is placed and weighed in said produce bags and said self-adhesive bar coded labels are attached to said produce bags and scanned by said remote scanning device.

10. A system for merchandise checkout comprising:

means for remotely scanning a product tag included on each of a plurality of products chosen by a purchaser, said product tag including a security tag device and product identity information associated with one of said plurality of products to which said product tag is affixed;

means for reading said product information included within said product tag for said one of said plurality of products and for deactivating said security tag device generally simultaneously with said reading during said scanning, said security tag device capable of being deactivated only in response to said product identity information being read;

means for wirelessly transmitting said product identity information to a computer system having a memory indexing price information with said product identity information to accumulate a transaction total from a series of products presented for purchase; and means for providing said transaction total to one or a plurality of check-out terminals in response to a presence of said purchaser wherein a payment amount is presented.

11. The system for merchandise checkout according to claim 10, further comprising means for accepting discount coupons from said purchaser and transferring information on said coupons to said computer system for adjusting said indexing price information delivered to said purchaser.

12. The system for merchandise checkout according to claim 10, further comprising means for notifying said purchaser that a successful scan of said product identity information and deactivation of a security tag device has been accomplished.

13. The system for a merchandise checkout according to claim 10, wherein said means for scanning further comprises said computer system having a radio frequency (RF) transceiver and a remote scanning device also having said radio frequency (RF) transceiver wherein when said purchaser scans said product identity information said product identity information is transmitted to and received by said computer system for calculating a new total price wherein said new total price is transmitted to and received by said remote scanning device and displayed to said purchaser.

14. The system for merchandise checkout according to claim 13, further comprising means for generating a notification signal if at least one said product having a security tag has not been deactivated by said remote scanning device.

15. The system for merchandise checkout according to claim 14, further comprising means for receiving scanned and unwanted products by said purchaser and updating said remote scanning device with said computer system to reflect an adjusted price total to said purchaser.

16. The system for merchandise checkout according to claim 15, further comprising means for replacing said product tag with a new product tag for said unwanted products.

17. The system for merchandise checkout according to claim 13, further comprising means for generating self-adhesive bar coded labels, said bar coded labels indicative of a product code corresponding to produce wherein said self-adhesive bar coded labels are printed and dispensed after said produce is placed and weighed in produce bags and said self-adhesive bar coded labels are attached to said produce bags and scanned.

18. The system for merchandise checkout according to claim 17, further comprising means for verifying that said produce bags are properly weighed, labeled and read by said remote scanning device by said purchaser.

19. The system for merchandise checkout according to claim 10, further comprising:
means for determining an actual combined total weight of said products purchased during a purchase transaction, wherein said computer system including an actual weight of said products; and
means for comparing said actual combined total weight of said products with a predicted total weight determined by said computer system and means for generating a notification signal when said actual combined total weight is not within a predetermined range of said predicted total weight for a transaction.

20. An apparatus for use in a merchandise checkout system comprising:
a remote scanning device operable to read a product tag included on each of a plurality of products, said product tag including a security tag device and product identity information associated with one of said plurality of products to which said product tag is affixed;
said remote scanning device for scanning said product tag for each of said plurality of products;
said remote scanning device for reading said product information included within said product tag for said one of said plurality of products and deactivating said security tag device generally simultaneously with said reading during said scanning, said security tag device capable of being deactivated only in response to said product identity information being read; and
said remote scanning device for wirelessly transmitting said product identity information to a computer system.

21. An apparatus according to claim 20, further comprising said remote scanning device reading said product identity information using infra-red technology to scan coded levels on said products.

22. An apparatus according to claim 20, further comprising said remote scanning device having a radio frequency (RF) transceiver for sending and updating said product identity information to said computer system.

23. An apparatus according to claim 20, further comprising said remote scanning device launching an electromagnetic pulse for deactivating said security measures associated with said products.

* * * * *